United States Patent
Kampati et al.

(10) Patent No.: US 12,316,619 B2
(45) Date of Patent: May 27, 2025

(54) METHODS AND SYSTEMS FOR INTERNET KEY EXCHANGE RE-AUTHENTICATION OPTIMIZATION

(71) Applicant: Huawei Technologies Co., Ltd., Shenzhen (CN)

(72) Inventors: Sandeep Kampati, Bangalore (IN); Lohit S, Bangalore (IN); Shubham Mamodiya, Bangalore (IN); Bharath Soma Satya Meduri, Bangalore (IN); Vishnu Vardhan Bachu V N, Bangalore (IN); Dharmanandana Reddy Pothula, Bangalore (IN); Karthigaasri R T, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/716,470

(22) Filed: Apr. 8, 2022

(65) Prior Publication Data
US 2022/0263811 A1   Aug. 18, 2022

Related U.S. Application Data

(63) Continuation of application No. PCT/CN2020/118193, filed on Sep. 27, 2020.

(30) Foreign Application Priority Data

Oct. 10, 2019   (IN) .............................. 201931040879

(51) Int. Cl.
H04L 9/40   (2022.01)
(52) U.S. Cl.
CPC ........ *H04L 63/061* (2013.01); *H04L 63/0428* (2013.01)

(58) Field of Classification Search
CPC . H04L 63/061; H04L 63/0428; H04L 63/164; H04L 63/08; H04L 63/205; H04L 69/28
(Continued)

(56) References Cited

U.S. PATENT DOCUMENTS 6,965,992 B1 *  11/2005  Joseph ................. H04L 9/0866
                                                     713/153
8,046,829 B2    10/2011  Oba
(Continued)

FOREIGN PATENT DOCUMENTS

| CN | 106254376 A | 12/2016 |
| CN | 106302376 A | 1/2017 |
| WO | 2014100967 A1 | 7/2014 |

OTHER PUBLICATIONS

S. Kampati, et al, "IKEv2 Optional SAandTS Payloads in Child Exchange," draft-kampati-ipsecme-ikev2-sa-ts-payloads-opt-01, May 21, 2019, 11 pages, XP015133044.
(Continued)

*Primary Examiner* — Amare F Tabor
(74) *Attorney, Agent, or Firm* — Conley Rose, P.C.

(57) ABSTRACT

A method for Internet Key Exchange (IKE) re-authentication optimization includes sending, by a first network device and a second network device, a notification, which contains new Security Parameters Index (SPI) for new security association (SA), and sending, by the first network device alone, an OLD_SPI notification to map SPI of Internet Protocol Security (IPsec) (Authentication Header (AH)/ Encapsulating Security Payload (ESP)) with the old IPSec SA.

25 Claims, 10 Drawing Sheets

(58) Field of Classification Search
USPC .......................................................... 713/153
See application file for complete search history.

(56) References Cited

U.S. PATENT DOCUMENTS

| | | | |
|---|---|---|---|
| 8,099,597 | B2 | 1/2012 | Nakhjiri |
| 8,245,039 | B2 | 8/2012 | Jones |
| 8,275,989 | B2* | 9/2012 | Huitema ............. H04L 63/0823 |
| | | | 713/171 |
| 8,457,635 | B2 | 6/2013 | Bachmann et al. |
| 8,539,559 | B2 | 9/2013 | Nakhjiri |
| 9,124,564 | B2* | 9/2015 | Kandasamy .............. H04L 9/14 |
| 10,609,008 | B2* | 3/2020 | Vemulapalli ............ H04L 9/002 |
| 2006/0041742 | A1 | 2/2006 | Oba |
| 2009/0327721 | A1* | 12/2009 | Arkko ................. H04L 63/0884 |
| | | | 713/168 |
| 2010/0017603 | A1 | 1/2010 | Jones |
| 2014/0095862 | A1* | 4/2014 | Yang .................... H04L 63/164 |
| | | | 713/151 |
| 2015/0244685 | A1* | 8/2015 | Shah ................... H04W 12/068 |
| | | | 713/155 |
| 2017/0126645 | A1 | 5/2017 | Froelicher et al. |
| 2018/0359231 | A1 | 12/2018 | Vemulapalli et al. |

OTHER PUBLICATIONS

RFC 4718, P. Eronen, et al, "IKEv2 Clarifications and Implementation Guidelines," Oct. 2006, 58 pages.
RFC 5996, C. Kaufman, et al, "Internet Key Exchange Protocol Version 2 (IKEv2)," Sep. 2010, 138 pages.
RFC 4478, Y. Nir, "Repeated Authentication in Internet Key Exchange (IKEv2) Protocol," Apr. 2006, 5 pages, XP015046384.
RFC 7296, C. Kaufman, et al, "Internet Key Exchange Protocol Version 2 (IKEv2)," Oct. 2014, 142 pages, XP015104486.
S. Kampati, "IKEv2 Optional SA and TS Payloads in Child Exchange," draft-kampati-ipsecme-ikev2-sa-ts-payloads-ppt-00, Feb. 18, 2019, 11 pages.

* cited by examiner

METHODS AND SYSTEMS FOR INTERNET KEY EXCHANGE RE-AUTHENTICATION OPTIMIZATION

CROSS-REFERENCE TO RELATED APPLICATIONS

This is a continuation of International Patent Application No. PCT/CN2020/118193 filed on Sep. 27, 2020, which claims priority to Indian Patent Application No. IN201931040879 filed on Oct. 10, 2019. The disclosures of the aforementioned applications are hereby incorporated by reference in their entireties.

TECHNICAL FIELD

The present subject matter described herein, in general, relates to re-authentication of Internet of things (IoT) and in particular, it relates to methods and systems for Internet Key Exchange (IKE) re-authentication optimization.

BACKGROUND

The IKE version 2 (IKEv2) is a virtual private network (VPN) encryption protocol that handles request and response actions. It makes sure the traffic is secure by establishing and handling the security association (SA) attribute within an authentication suite-usually Internet Protocol (IP) Security (IPsec) since IKEv2 is basically based on it and built into it. Like any VPN protocol, IKEv2 is responsible for establishing a secure tunnel between the VPN client and the VPN server. It does that by first authenticating both the client and the server, and then agreeing on which encryption methods will be used. SA is the process of establishing security attributes between two network entities (in this case, the VPN client and the VPN server). It does that by generating the same symmetric encryption key for both entities. Said key is then used to encrypt and decrypt all the data that travels through the VPN tunnel. The IPsec is a network protocol suite that authenticates and encrypts the packets of data sent over a network.

The IKE performs mutual authentication between two parties and establishes an IKE SA that includes shared secret information that can be used to efficiently establish SAs for Encapsulating Security Payload (ESP) and/or Authentication Header (AH) and a set of cryptographic algorithms to be used by the SAs to protect the traffic they carry. An initiator proposes one or more suites by listing supported algorithms that can be combined into suites in a mix-and-match fashion. IKE also negotiates use of IP Payload Compression (IPComp) in connection with an ESP and/or AH SA.

Significantly, the IKE message flow consists of a request that is followed by a response and the onus lies on the requester to ensure reliability. If the response is not received within a timeout interval, the requester needs to retransmit the request or abandon the connection. The first request/response of an IKE session (IKE_SA_INIT) negotiates security parameters for the IKE_SA, sends nonces, and sends Diffie-Hellman values. The second request/response (IKE_AUTH) transmits identities, proves knowledge of the secrets corresponding to the two identities, and sets up an SA for the first (and often only) AH and/or ESP CHILD_SA.

In this regard, reference is made to FIG. 1 which illustrates how information is exchanged via an IPsec tunnel. In particular, FIG. 1 illustrates a simple IKE/IPsec deployment between two routers where IKE SA is created after initial message negotiation and IPsec after the authentication is success between two routers. Once IPsec tunnel is established the actual data packets can be encrypted and decrypted using this IPsec tunnel, as other approaches of the present disclosure. When data traffic is to be exchanged between host A and host B, the following steps occur.

Host A via router A sends data traffic to host B through router B.

Routers A and B negotiate an IKE phase one session, i.e., the IKE SA session.

Routers A and B subsequently negotiate an IKE phase two session, i.e., the IPsec SA.

An IPsec tunnel is created between host A and host B and data traffic is exchanged via said IPsec tunnel.

The IPSec tunnel is terminated once the data traffic is exchanged.

FIG. 2 illustrates the negotiation of IKE SA and IPsec SA as per IKEv2 Request for Comments (RFC) wherein the four messages, viz., INIT request, INIT response, AUTH request and AUTH response together help to establish one IKE and IPsec SA which in turn is one IPsec tunnel to protect data packet traffic, as other approaches of the present disclosure. All the payloads negotiated in all messages are as per RFC. The IKE tunnel is created and IPsec (AH/ESP) tunnel is created after INIT and AUTH exchanges. Both end users can configure for life time of reauthentication (reauth). Reauth is used to reauthenticate the peer and recreate all the IKE and IPsec SAs again. Significantly, reauth verifies that both the peers retain their access to authentication credentials. It is triggered based on timer or if authentication credential is no longer valid (e.g. certificate got expired or revoked). Notably, reauth recreates all the IKE and child SAs again that means establishes new keys for the IKE SA and child SAs and once the new IKE and child SAs are created, the old IKE and child SAs are deleted, as illustrated in FIG. 3.

FIG. 3 and FIG. 4 illustrates the procedure for reauthentication of peer where in after every periodic time the peer device will get authenticated as per RFC defined as reauthentication where the complete INIT and AUTH messages are negotiated creating a new IKE and IPsec SA and deleting old IKE and IPsec SA, as other approaches of the present disclosure.

Traffic selector (TS) payloads allow endpoints to communicate some of the information from their security policy database (SPD) to their peers. TS payloads specify the selection criteria for packets that will be forwarded over the newly set up SA. Two TS payloads appear in each of the messages in the exchange that creates a child SA pair and each TS payload contains one or more TSs where each TS consists of an address range (IP version 4 (IPv4) or IP version 6 (IPv6)), a port range, and an IP protocol identifier (ID).

In a solution, as illustrated in FIG. 4, the IKE reauth has SA payloads in INIT and AUTH exchange, which contains single/multiple cryptographic suite. Usually these suits are not changed at reauth time since payload size will increase exponentially for multiple cryptographic suites in IKE/IPsec SA. Also, in the auth exchange TS-initiator (TSi) and TS-responder (TSr) are also sent, which usually do not change during reauth, since before reauth if there is any change in TSi or TSr then all existing devices delete the SA and recreate based on new TSi and TSr, therefore, sending TSi and TSr in auth exchange during reauth has no value. Further, since reauth may be triggered periodically or whenever certificate expires, it will consume additional bandwidth and power to process these payloads.

A major drawback associated with this existing technology is the need for sending SA and TS payloads in IKE reauth even when there are no configuration changes which results in unnecessary consumption of bandwidth, processing time and power. Notably, the minimum size of (single set of cryptographic suite) SA payload is 40 bytes while minimum size of TS payloads is for IPv4 it is 24*2=48 bytes, IPv6 48*2=96 bytes. Another drawback associated with the existing technology is that the IKE_INIT exchange is vulnerable to attacks since they are sent in plain text. Yet another drawback associated with the existing technology is that at least four messages are required to do reauth.

Accordingly, there exists a need to avoid sending the SA payload in INIT exchange during reauth when there is no change in the IKE cryptographic suits or policy. Further, there also exists a need to avoid sending SA, TS payload in AUTH exchange during reauth when there is no change in the IPsec cryptographic suits or policy. Furthermore, there also exists a need to avoid vulnerable attacks during reauth and to reduce number of messages required to perform reauth. In particular, there exists a need for IKEv2 re-authentication optimization for SA and TS payloads support.

The above-described need for IKEv2 re-authentication optimization for SA and TS payloads support is merely intended to provide an overview of some of the shortcomings of conventional systems/mechanism/techniques, and is not intended to be exhaustive. Other problems/shortcomings with conventional systems/mechanism/techniques and corresponding benefits of the various non-limiting embodiments described herein may become further apparent upon review of the following description.

SUMMARY

This summary is provided to introduce concepts related to methods and systems for IKE re-authentication optimization, and the same are further described below in the detailed description. This summary is not intended to identify essential features of the claimed subject matter nor is it intended for use in determining or limiting the scope of the claimed subject matter.

An objective of the present disclosure is to provide a mechanism for IKEv2 re-authentication optimization for SA and TS payloads support.

Another objective of the present disclosure is to avoid sending the SA payload in INIT exchange during reauth when there is no change in the IKE cryptographic suits or policy.

Yet another objective of the present disclosure is to avoid sending SA, TS payload in AUTH exchange during reauth when there is no change in the IPsec cryptographic suits or policy.

Yet another objective of the present disclosure is to avoid vulnerable attacks during reauth and to reduce number of messages required to perform reauth.

In particular, the present disclosure teaches sending, by a first network device (initiator) and a second network device (responder), a notification, i.e., a SA_TS_UNCHANGED notification which contains new Security Parameters Index (SPI) for new SA, since the SA and TS payloads are no longer being sent. It also teaches sending, by the first network device (initiator) alone, an OLD_SPI notification to map SPI of IPsec (AH/ESP) with the old IPsec SA. It also teaches combining the INIT and AUTH exchanges and encrypting them before sending said combination in the existing IKE tunnel to avoid vulnerable attacks during reauth and to reduce the total number of messages required to be transmitted to perform reauth.

According to first aspect of the disclosure, there is provided a method for reauthentication (reauth). The method comprising determining, by a first network device, whether there is time expiry for an initial authentication associated with the first network device, sending, by the first network device, a reauth INIT request message to a second network device for reauthentication, when there is no change in a cryptographic suite associated with the first network device, wherein the reauth INIT request message comprises a first INIT notification message carrying a first NEW SPI value, receiving, by the first network device, a reauth INIT response message from the second network device, wherein the reauth INIT response message carries a second INIT notification message carrying a second NEW SPI value, and reauthentication, by the first network device, an SA according to the first NEW SPI value and the second NEW SPI value, when there is no change in the cryptographic suite associated with the first network device and in the cryptographic suite associated with the second network device, wherein the cryptographic suite associated with the first network device is the same as the cryptographic suite associated with the second network device.

In a first possible implementation of the method according to the first aspect, an IKE tunnel and an IPsec tunnel are established between the first network device and the second network device.

In a second possible implementation of the method according to the first aspect, the first INIT notification message is SA_UNCHANGED.

In a third possible implementation of the method according to the first aspect, the second INIT notification message is SA_UNCHANGED.

In a fourth possible implementation of the method according to the first aspect, the SA comprises an IKE SA or an IPsec SA.

In a fifth possible implementation of the method according to the first aspect, the reauthenticating comprises creating a new SA and deleting an old SA, wherein when the SA is the IKE SA, reauthenticating comprises deleting the IKE SA and creating a new IKE SA, wherein the first SPI is an initiator SPI deployed as an initiator cookie for the new IKE SA, and the second SPI is deployed as a responder cookie for the new IKE SA, wherein when the SA is the IPsec SA which is a child SA of the IKE SA, reauthenticating comprises deleting the IPsec SA and creating a new IPsec SA, wherein the first SPI is deployed as an inbound SPI in the first network device for the new IPsec SA and is deployed as an outbound SPI in the second network device for the new IPsec SA, and the second SPI is deployed as an inbound SPI in the second network device for the new IPsec SA and is deployed as an outbound SPI in the first network device for the new IPsec SA.

In a sixth possible implementation of the method according to the first aspect, further comprising the steps of sending, by the first network device, an reauth AUTH request message comprising a first AUTH notification payload to the second network device, when there is no change in SA and TS payloads, and receiving, by the first network device, a reauth AUTH response message comprising a second AUTH notification payload from the second network device, when there is no change in a cryptographic suite associated with the second network device.

In a seventh possible implementation of the method according to the first aspect, the first AUTH notification payload is SA_TS_UNCHANGED.

In an eighth possible implementation of the method according to the first aspect, the second AUTH notification payload is SA_TS_UNCHANGED.

In a ninth possible implementation of the method according to the first aspect, the reauth AUTH request message further comprises an OLD_SPI notification message, said notification message comprising an old SPI to identify old IKE or IPsec SA at the first network device.

In a tenth possible implementation of the method according to the first aspect, further comprises the step of identifying, by the second network device, the OLD IKE SA by the OLD_SPI notification message to determine the SA on the second device.

In an eleventh possible implementation of the method according to the first aspect, the new IPsec SA is a child SA of the IKE SA, the new child SA during reauthentication is created by a create child SA exchange comprises deleting the IPsec SA and creating a new IPsec SA, wherein the first SPI is deployed as an inbound SPI in the first network device for the new IPsec SA and is deployed as an outbound SPI, wherein the OLD SPI is deployed to identify the old IPsec SA which is inbound of SPI of OLD SA and outbound SPI of second device OLD SA, in the second network device for the new IPsec SA, and the second SPI is deployed as an inbound SPI in the second network device for the new IPsec SA and is deployed as an outbound SPI in the first network device for the new IPsec SA.

In a twelfth possible implementation of the method according to the first aspect, the cryptographic suite associated with the first network device is stored at the first network device, and wherein the cryptographic suite associated with the second network device is stored at the second network device.

According to second aspect of the disclosure, there is provided a method for reauthentication (reauth). The method comprising the steps of determining, by a first network device, whether there is time expiry for the initial authentication associated with the first network device, sending, by the first network device, an optimal reauth request message to a second network device for reauthentication, when there is no change in a cryptographic suite associated with the first network device, wherein the optimal reauth request message encrypted by OLD IKE SA Keys comprises of: SA, keying payload (KE), nonce (Ni), certificate (CERT), certificate request (CERTREQ), optional identity response (IDr), initiator identity payload (Idi), authentication payload (AUTH), TSs of initiators and responders (TSi,TSr), IPsec SA payload (Sai), receiving, by the first network device, an optimal reauth response message from the second network device, wherein the optimal reauth response message encrypted by keys of OLD IKE SA comprises SA, KE, Ni, CERT, CERTREQ, IDr, Idi, AUTH, TSi, TSr, Sar, and reauthentication, by the first network device, an SA according to the optimal reauth request message comprising a NEW SPI value and the optimal reauth response message comprising a NEW SPI value, when there is no change in the cryptographic suite associated with the first network device and in the cryptographic suite associated with the second network device, wherein the cryptographic suite associated with the first network device is the same as the cryptographic suite associated with the second network device.

In a first possible implementation of the method according to the second aspect, an IKE tunnel and an IPsec tunnel are established between the first network device and the second network device.

In a second possible implementation of the method according to the second aspect, the reauthenticating comprises creating a new SA and deleting an old SA, wherein when the SA is the IKE SA, reauthenticating comprises deleting the IKE SA and creating a new IKE SA, wherein the first SPI is an initiator SPI deployed as an initiator cookie for the new IKE SA, and the second SPI is deployed as a responder cookie for the new IKE SA, wherein when the SA is the IPsec SA which is a child SA of the IKE SA, reauthenticating comprises deleting the IPsec SA and creating a new IPsec SA, wherein the first SPI is deployed as an inbound SPI in the first network device for the new IPsec SA and is deployed as an outbound SPI in the second network device for the new IPsec SA, and the second SPI is deployed as an inbound SPI in the second network device for the new IPsec SA and is deployed as an outbound SPI in the first network device for the new IPsec SA.

In a third possible implementation of the method according to the second aspect, the SA comprises an IKE SA or an IPsec SA.

In a fourth possible implementation of the method according to the second aspect, the cryptographic suite associated with the first network device is stored at the first network device, and wherein the cryptographic suite associated with the second network device is stored at the second network device.

According to third aspect of the disclosure, there is provided a system for reauthentication (reauth) in a network. The system comprises a first network device, and a second network device, wherein the first network device is adapted to determine whether there is time expiry for an initial authentication associated with the first network device, send a reauth INIT request message to a second network device for reauthentication, when there is no change in a cryptographic suite associated with the first network device, wherein the reauth INIT request message comprises a first INIT notification message carrying a first NEW SPI value, receive a reauth INIT response message from the second network device, wherein the reauth INIT response message carries a second INIT notification message carrying a second NEW SPI value, and reauthenticate an SA according to the first NEW SPI value and the second NEW SPI value, when there is no change in the cryptographic suite associated with the first network device and in the cryptographic suite associated with the second network device, wherein the cryptographic suite associated with the first network device is the same as the cryptographic suite associated with the second network device.

In a first possible implementation of the system according to the third aspect, an IKE tunnel and an IPsec tunnel are established between the first network device and the second network device.

In a second possible implementation of the system according to the third aspect, the first INIT notification message is SA_UNCHANGED.

In a third possible implementation of the system according to the third aspect, the second INIT notification message is SA_UNCHANGED.

In a fourth possible implementation of the system according to the third aspect, the SA comprises an IKE SA or an IPsec SA.

In a fifth possible implementation of the system according to the third aspect, the reauthenticate comprises creating a new SA and deleting an old SA, wherein when the SA is the IKE SA, reauthenticate comprises deleting the IKE SA and creating a new IKE SA, wherein the first SPI is an initiator SPI deployed as an initiator cookie for the new IKE SA, and the second SPI is deployed as a responder cookie for the new IKE SA, wherein when the SA is the IPsec SA which is a child SA of the IKE SA, reauthenticating comprises deleting the IPsec SA and creating a new IPsec SA, wherein the first SPI is deployed as an inbound SPI in the first network device for the new IPsec SA and is deployed as an outbound SPI in the second network device for the new IPsec SA, and the second SPI is deployed as an inbound SPI in the second network device for the new IPsec SA and is deployed as an outbound SPI in the first network device for the new IPsec SA.

In a sixth possible implementation of the system according to the third aspect, the first network device is further adapted to send an reauth AUTH request message comprising a first AUTH notification payload to the second network device, when there is no change in SA and TS payloads, and receive a reauth AUTH response message comprising a second AUTH notification payload from the second network device, when there is no change in a cryptographic suite associated with the second network device.

In a seventh possible implementation of the system according to the third aspect, the first AUTH notification payload is SA_TS_UNCHANGED.

In an eighth possible implementation of the system according to the third aspect, the second AUTH notification payload is SA_TS_UNCHANGED.

In a ninth possible implementation of the system according to the third aspect, the reauth AUTH request message further comprises an OLD_SPI notification message, said notification message comprising an old SPI to identify old IKE or IPsec SA at the first network device.

In a tenth possible implementation of the system according to the third aspect, the second network device is adapted to identify the OLD IKE SA by the OLD_SPI notification message to determine the SA on the second device.

In a eleventh possible implementation of the system according to the third aspect, the new IPsec SA is a child SA of the IKE SA, the new child SA during reauthentication is created by a create child SA exchange comprises deleting the IPsec SA and creating a new IPsec SA, wherein the first SPI is deployed as an inbound SPI in the first network device for the new IPsec SA and is deployed as an outbound SPI, wherein the OLD SPI is deployed to identify the old IPsec SA which is inbound of SPI of OLD SA and outbound SPI of second device OLD SA, in the second network device for the new IPsec SA, and the second SPI is deployed as an inbound SPI in the second network device for the new IPsec SA and is deployed as an outbound SPI in the first network device for the new IPsec SA.

In a twelfth possible implementation of the system according to the third aspect, the cryptographic suite associated with the first network device is stored at the first network device, and wherein the cryptographic suite associated with the second network device is stored at the second network device.

According to a fourth aspect of the disclosure, there is provided a system for reauthentication (reauth) in a network system. The system comprising a first network device, and a second network device, wherein the first network device is adapted to determine whether there is time expiry for the initial authentication associated with the first network device, send an optimal reauth request message to the second network device for reauthentication, when there is no change in a cryptographic suite associated with the first network device, wherein the optimal reauth request message encrypted by OLD IKE SA Keys comprises of SA, KE, Ni, CERT, CERTREQ, IDr, Idi, AUTH, TSi, TSr, Sai, receive an optimal reauth response message from the second network device, wherein the optimal reauth response message encrypted by keys of OLD IKE SA comprises of SA, KE, Ni, CERT, CERTREQ, IDr, Idi, AUTH, TSi, TSr, Sar, and reauthenticate a SA according to the optimal reauth request message comprising a NEW SPI value and the optimal reauth response message comprising a NEW SPI value, when there is no change in the cryptographic suite associated with the first network device and in the cryptographic suite associated with the second network device, wherein the cryptographic suite associated with the first network device is the same as the cryptographic suite associated with the second network device.

In a first possible implementation of the system according to the fourth aspect, an IKE tunnel and an IPsec tunnel are established between the first network device and the second network device.

In a second possible implementation of the system according to the fourth aspect, the reauthenticate comprises creating a new SA and deleting an old SA, wherein when the SA is the IKE SA, reauthenticate comprises deleting the IKE SA and creating a new IKE SA, wherein the first SPI is an initiator SPI deployed as an initiator cookie for the new IKE SA, and the second SPI is deployed as a responder cookie for the new IKE SA, wherein when the SA is the IPsec SA which is a child SA of the IKE SA, reauthenticating comprises deleting the IPsec SA and creating a new IPsec SA, wherein the first SPI is deployed as an inbound SPI in the first network device for the new IPsec SA and is deployed as an outbound SPI in the second network device for the new IPsec SA, and the second SPI is deployed as an inbound SPI in the second network device for the new IPsec SA and is deployed as an outbound SPI in the first network device for the new IPsec SA.

In a third possible implementation of the system according to the fourth aspect, the SA comprises an IKE SA or an IPsec SA.

In a fourth possible implementation of the system according to the fourth aspect, the cryptographic suite associated with the first network device is stored at the first network device, and wherein the cryptographic suite associated with the second network device is stored at the second network device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF DRAWINGS

The detailed description is described with reference to the accompanying figures. In the figures, the digit(s) of a reference number identifies the figure in which the reference number first appears. The same numbers are used throughout the drawings to refer like features and components.

Figure 1:
FIG. 1 illustrates a simple IKE/IPsec deployment between two Routers, as other approaches of the present disclosure.
Figure 2:
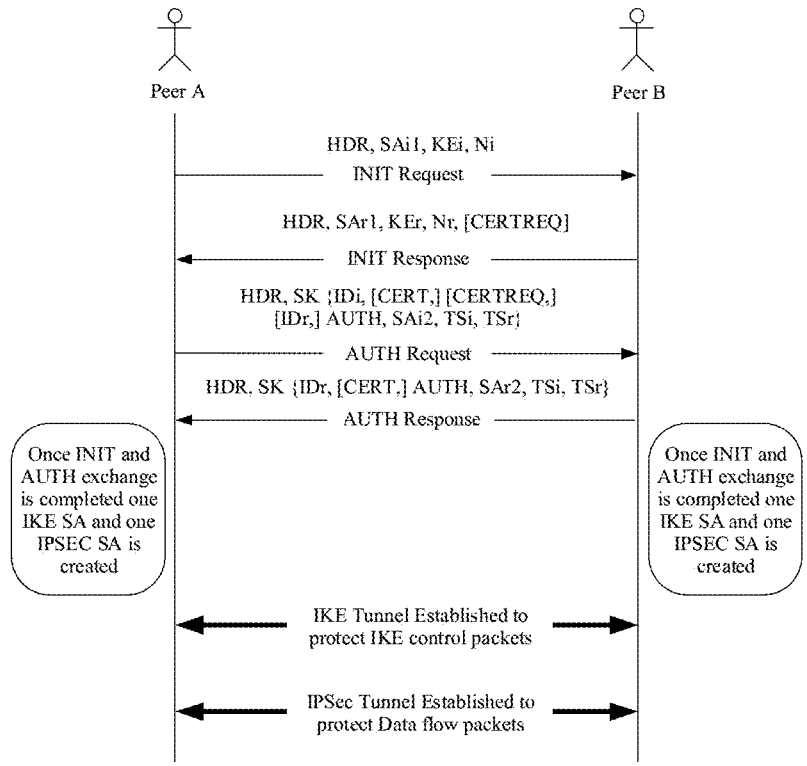
FIG. 2 illustrates the negotiation of IKE SA and IPsec SA as per IKEv2, as other approaches of the present disclosure.
Figure 3:
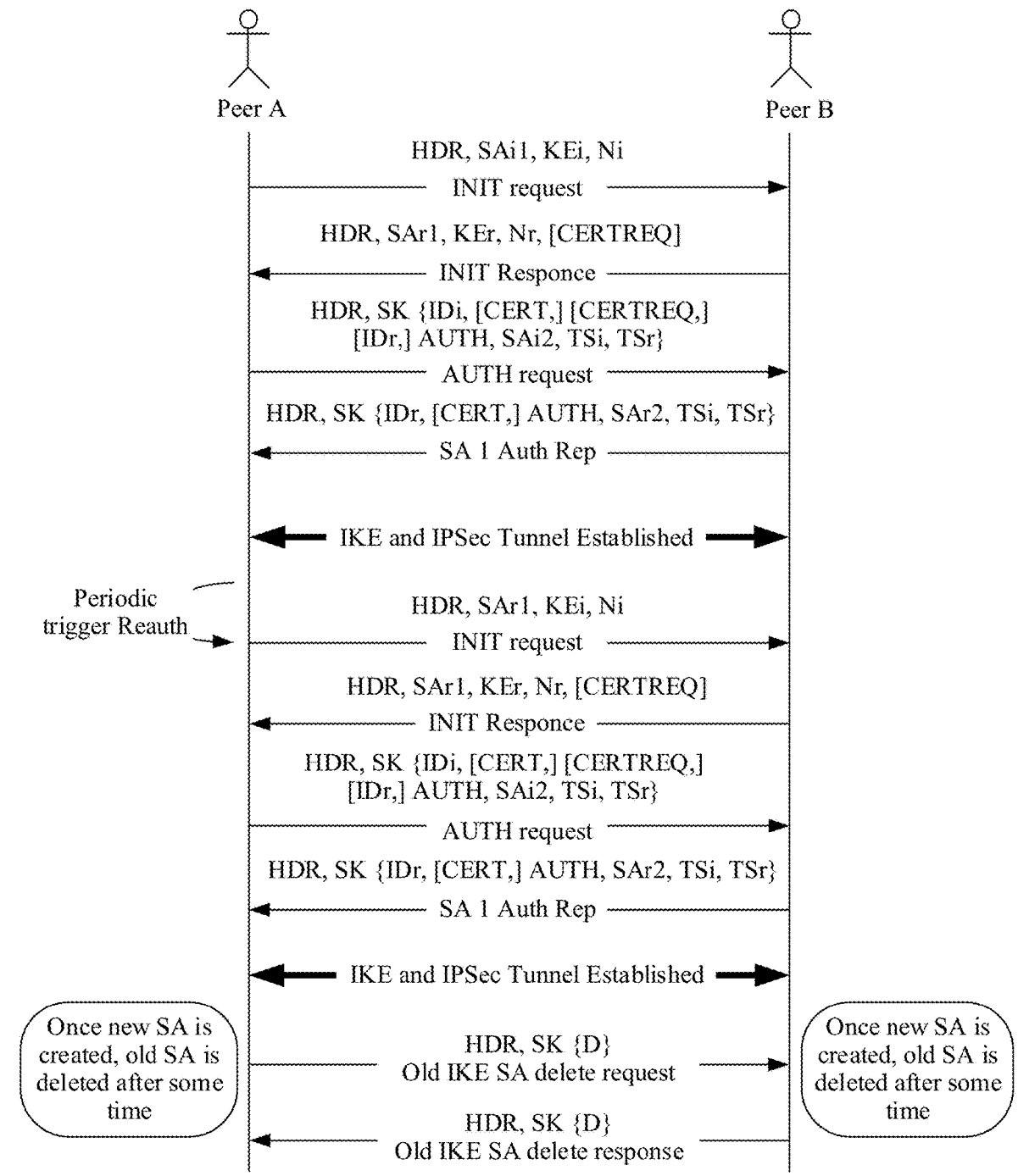
FIG. 3 and FIG. 4 illustrate the procedure for reauthentication of peer wherein after every periodic time the peer device will get authenticated, as other approaches of the present disclosure.
Figure 4:
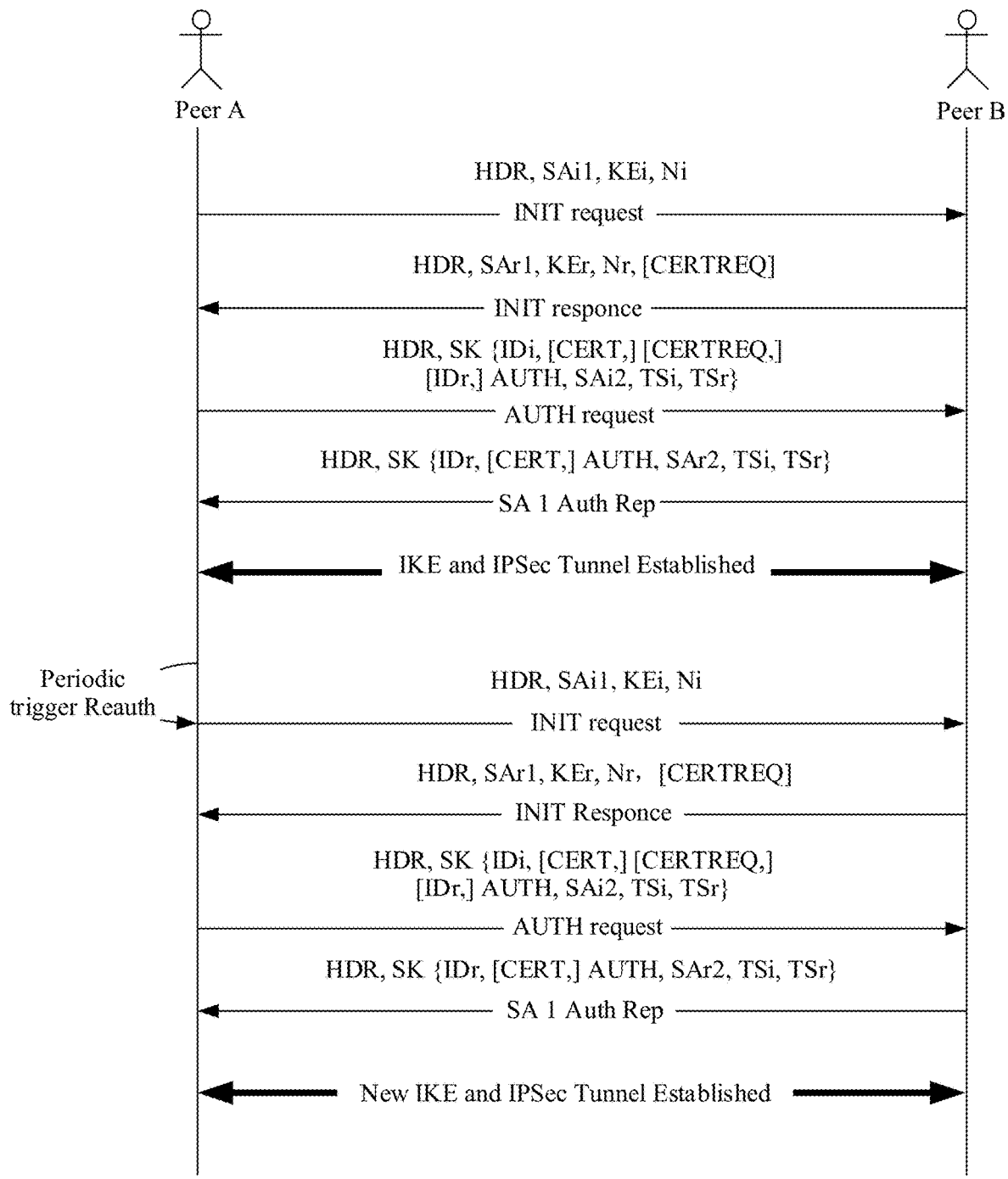

It is to be understood that the attached drawings are for purposes of illustrating the concepts of the disclosure and may not be to scale.

DESCRIPTION OF EMBODIMENTS

The following clearly describes the technical solutions in the embodiments of the present disclosure with reference to the accompanying drawings in the embodiments of the present disclosure. the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the disclosure may take, may be referred to as techniques. In general, the order of the steps of disclosed processes may be altered within the scope of the disclosure.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

In the following detailed description, numerous specific details are set forth in order to provide a thorough understanding of the disclosure. However, it will be understood by those skilled in the art that the present disclosure may be practiced without these specific details. In other instances, well-known methods, procedures, and components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In the present disclosure, "IKEv2" refers to IKE Version 2 as per RFC 7296.

In the present disclosure, "reauth" refers to the method to reauthenticate the peer and recreate all the IKE and IPsec SAs again. IKE Reauth procedure in IKEv2 is defined in RFC 7296.

In the present disclosure, "IPsec" refers to a network protocol suite that authenticates and encrypts the packets of data sent over a network.

In the present disclosure, "IPsec tunnel" refers to IPsec security tunnel used for encrypting and decrypting the data sent over this tunnel.

In the present disclosure, "SA" refers to one IPsec tunnel created after negotiating one INIT and AUTH message.

In the present disclosure, "IKE SA" refers to IKE phase 1 SA.

In the present disclosure, "IPsec SA" refers to child SA under IKE SA which is also called phase 2 SA.

In the present disclosure, "Child SAs" refers to phase 2 SA created after AUTH message negotiation.

In the present disclosure, "TS" refers to flow information which need to be protected by the IPsec tunnel.

In the present disclosure, "NEW SPI" refers to a new SPI which is used to identify SA after reauth.

Methods and systems for IKEv2 re-authentication optimization are disclosed. While aspects are described for IKEv2 re-authentication optimization for SA and TS payloads support, the present disclosure may be implemented in any number of different computing systems, environments, and/or configurations, the embodiments are described in the context of the following exemplary systems, devices/nodes/apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

The present disclosure provides methods and systems for IKEv2 re-authentication optimization.

The problems associated with the other approaches are that firstly, sending SA and TS payloads in IKE reauth even when there are no configuration changes results in unnecessary consumption of bandwidth, processing time and power, secondly, the IKE_INIT exchange is vulnerable to attacks since they are sent in plain text and finally, at least four messages are required to perform reauth. Accordingly, there is a need for IKEv2 re-authentication optimization for SA and TS payloads support.

is a mix-and-match of all algorithms that a device can support and peer device can select one from the list and use for SA creation.

Figure 6:
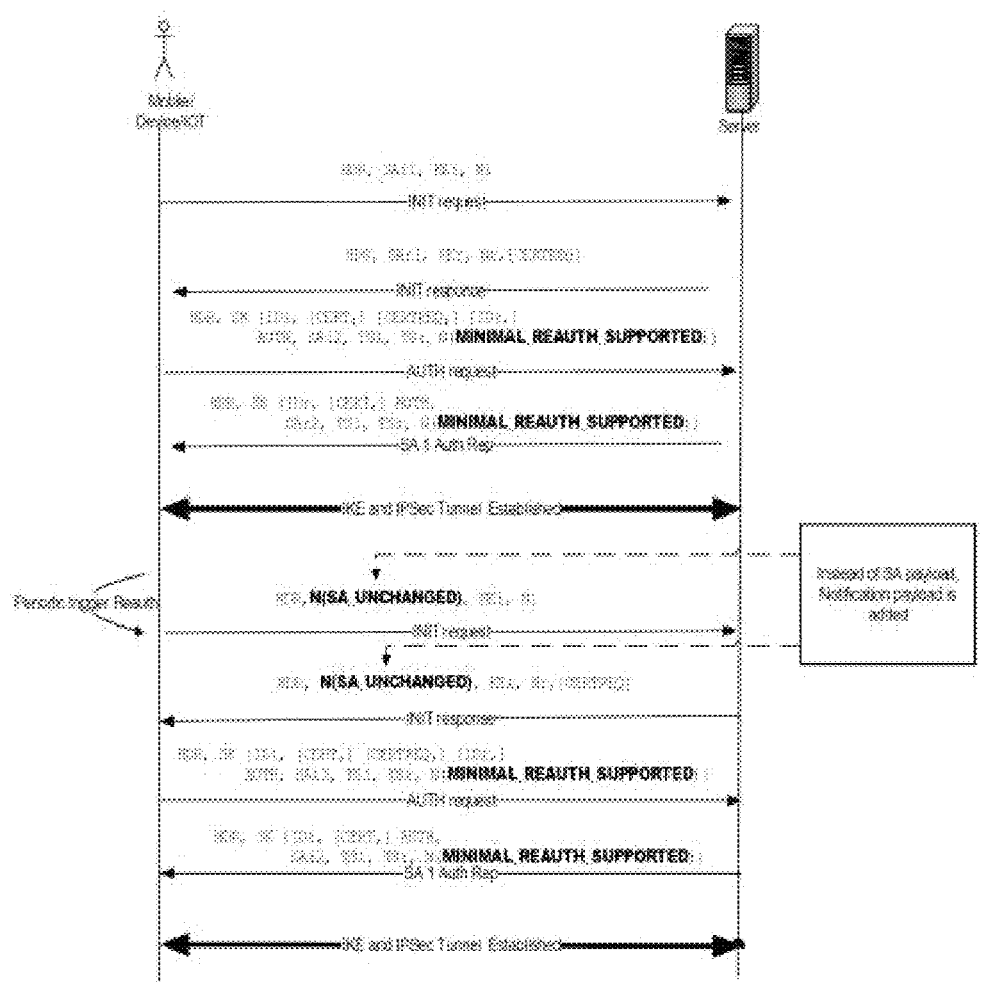
FIG. 6 illustrates how an SA payload negotiation is optimised by introducing a new notification SA_UN- CHANGED during reauthentication, in accordance with an embodiment of the present disclosure.

The present disclosure discloses optimization of the IKE_SA_INIT exchange. FIG. 6 illustrates how the SA payload negotiation is optimised by introducing a new notify SA_UNCHANGED during reauthentication when both the parties doesn't have any change in their cryptographic suites, in accordance with another embodiment of the present disclosure. In particular, during IKEv2 re-authentication using initial exchanges, the IKE_SA_INIT exchange contains SA payload having single/multiple cryptographic suite. Notably, most of the time these suits are not changed and the minimum size of (single set of cryptographic suite) SA payload is 52 bytes. Therefore, the IKE SA payload size will increase exponentially for multiple cryptographic suites. To overcome said drawback, the present disclosure discloses

```
For IKE SA following Negotiations happens according to RFC:
    SA = Proposal(crypto suites, SPI, protocol (ESP, AH, and/or IPcomp) )
        SA
            Proposal 1
              Number
              Protocol (IKE)
              SPI
              Transform
                 Type (Encryption, Integrity Protection,
                 Authentication, D-H Group, Compression)
                 Transform ID (DES, IDEA, etc.)
            Proposal 2
And for every IPSec SA following Negotiations happens according to RFC
    SA = Proposal(crypto suites, SPI, protocol (ESP, AH, and/or IPcomp) )
        SA
            Proposal 1
              Number
              Protocol (ESP - AH - IPComp)
              SPI
              Transform
                 Type (Encryption, Integrity Protection,
                 Authentication, D-H Group, Compression)
                 Transform ID (DES, IDEA, etc.)
            Proposal 2
    TS=description of traffic to be sent
Traffic Selectors in v2:
        "ID" payload only for IKE SA
        Child-SA uses "traffic selector" payload
        Allows lists of IP address ranges, port ranges
        Responder can narrow choice. Not just reject it if it doesn't match.
        Can choose subset of ranges, or subset within a range, or say "no,
        Must be single address pair"
    Derived keys = function of IKE keying material plus nonce in this exchange, plus output of
        Optional Diffie-Hellman.
```

Figure 5:
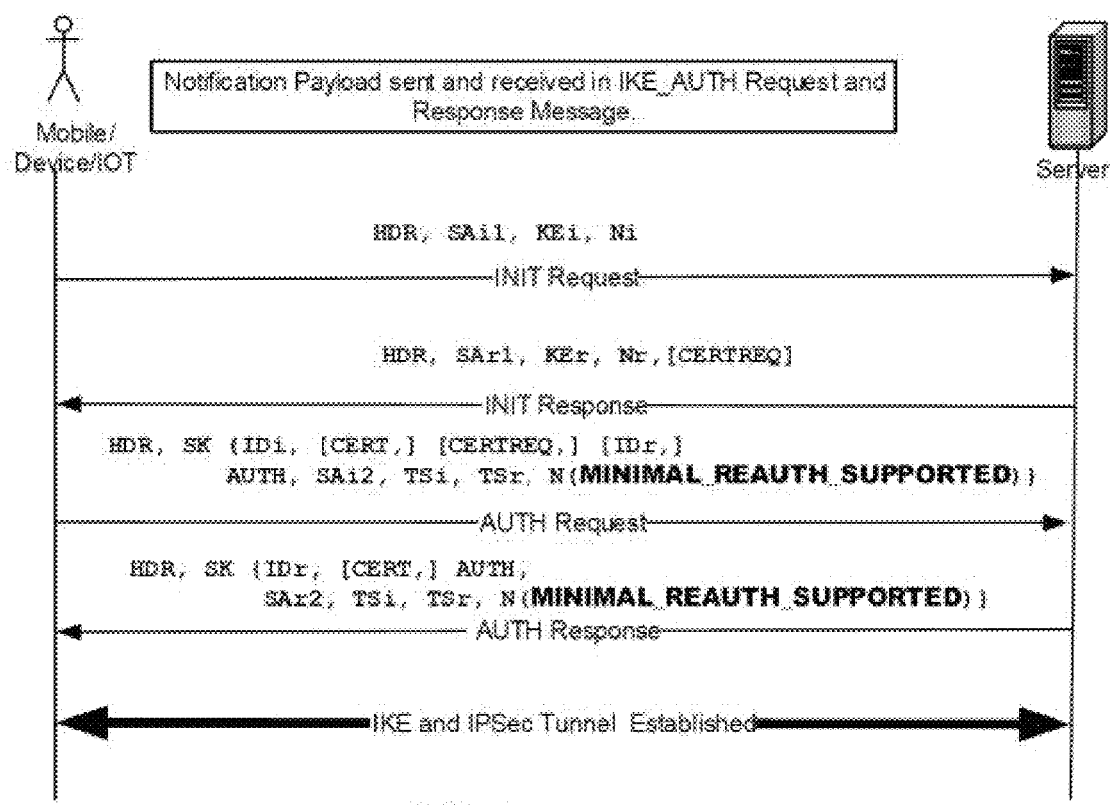
FIG. 5 illustrates a method of negotiating and accepting the procedure for minimal reauthentication support, in accordance with the present disclosure.

Reference is made to FIG. 5 where the initiator indicates its support for IKE/IPsec optional payloads at reauth and willingness to use it by including a notification payload of type MINIMAL_REAUTH_SUPPORTED in the IKE_AUTH request message. If the responder also supports this extension and is willing to use it, it includes the same notification of type MINIMAL_REAUTH_SUPPORTED in the IKE_AUTH response message. Here the new notification MINIMAL_REAUTH is negotiated and accepted by both devices.

Significantly, the initiator proposes one or more suites by listing supported algorithms that can be combined into suites in a mix-and-match fashion and the responder chooses a cryptographic suite from the initiator's offered choices and expresses that choice in the SAr1 payload, completes the Diffie-Hellman exchange with the KEr payload, and sends its nonce in the Nr payload. Therefore, a cryptographic suite that instead of SA payload, a notification payload is added with notification type as SA_UNCHANGED. Due to this new notification type addition, complete SA payload can be omitted which will reduce the message size and avoids the payload processing at both initiator and responder side. Based on this new notification, both initiator and responder have to use the negotiated cryptographic suite from existing IKE SA.

Figure 7:
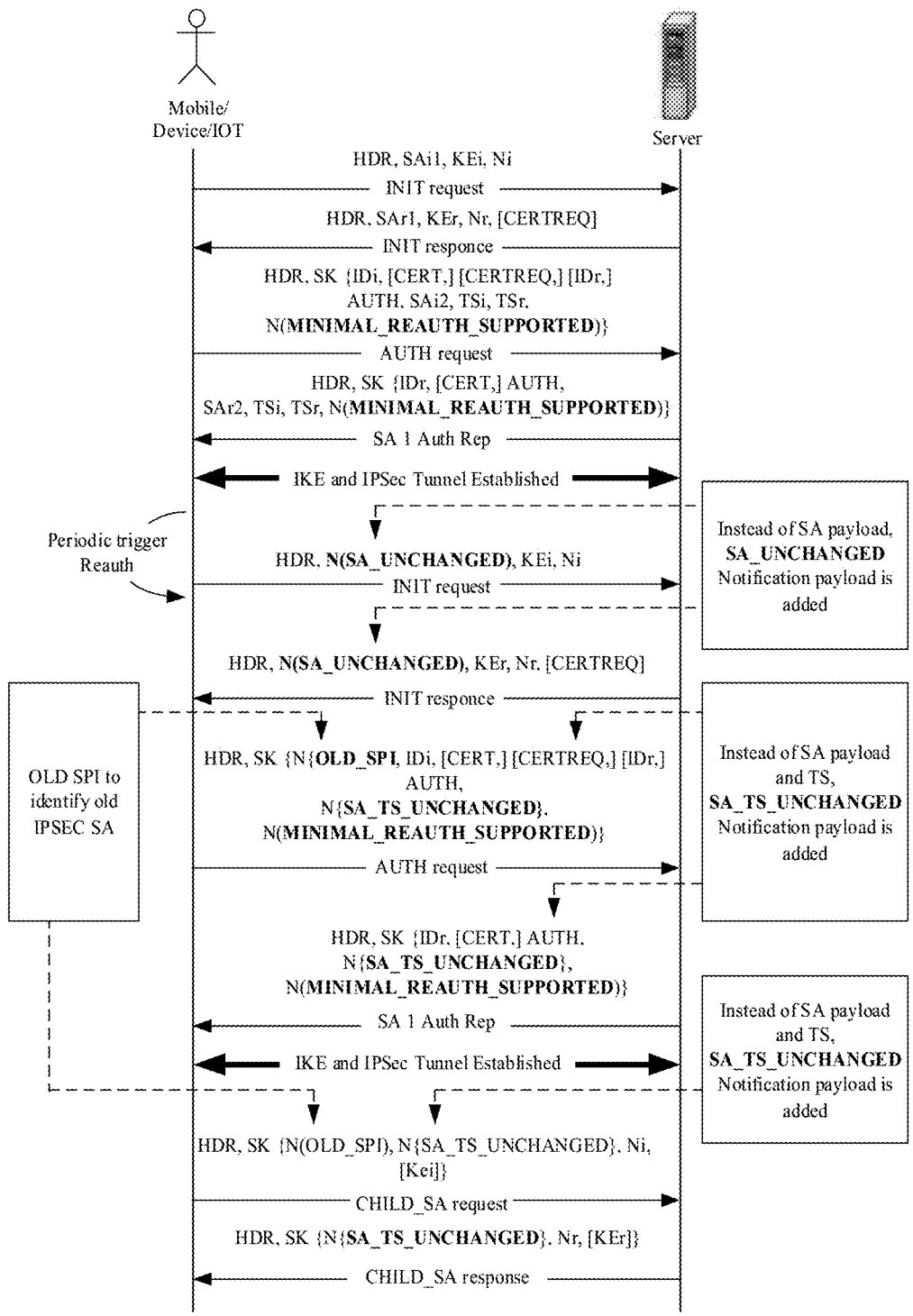
FIG. 7 illustrates how the SA payload negotiation is optimised by introducing a new notification SA_UN-CHANGED during reauthentication and introducing another notification SA_TS_UNCHANGED, in accordance with another embodiment of the present disclosure.

The present disclosure also discloses optimizing SA_INIT, AUTH and CREATE_CHILD_SA exchanges. FIG. 7 illustrates how the SA payload negotiation is optimised by introducing a new notification SA_UNCHANGED during reauthentication in INIT when both the network devices do not change their cryptographic suites and SA_TS_UNCHANGED notification in auth or child when there is no change in SA and TS configuration on both sides, in accordance with another embodiment of the present disclosure. During IKE reauth, usually there is no change in the cryptographic suites. Therefore, instead of sending SA payload in SA_INIT request and response messages, the present disclosure discloses SA_UNCHANGED notification payload. The IKE_AUTH exchange contains SA payload having single/multiple cryptographic suite. Moreover, since the suits hardly change and even TSi and TSr do not change, therefore, instead of sending SA and TSi, TSr payloads, the present disclosure teaches discloses OLD_SPI and SA_TS_UNCHANGED payloads. The OLD_SPI notification contains the SPI of the old IPsec SA which needs to be replaced and the SA_TS_UNCHANGED notification will contain SPI for the new IPsec SA. The CREATE_CHILD_SA exchange contains SA payload having single/multiple cryptographic suites that usually do not changed. Further, even the TSi and TSr do not change. Therefore, instead of sending SA and TSi, TSr payloads, the present disclosure discloses sending the OLD_SPI and SA_TS_UNCHANGED payloads. The CREATE_CHILD_SA exchange will be used to create IPsec SAs if there are multiple IPsec SAs under IKE SA.

Significantly, the SA_UNCHANGED notification in request message will contain initiator's IKE SPI value for the new IKE SA. The SA_UNCHANGED notification in response message will contain responder's IKE SPI value for the new IKE SA. The SA_TS_UNCHANGED notification in request message will contain initiator's inbound IPsec SPI value for the new IPsec SA. The SA_TS_UNCHANGED notification in response message will contain responder's inbound IPsec SPI value for the new IPsec SA. The OLD_SPI notification in request message will contain initiator's inbound IPsec SPI value for the old IPsec SA which needs to be replaced. OLD_SPI notification in response message will contain responder's inbound IPsec SPI value for the old IPsec SA which needs to be replaced.

Notably, due to these new notification types addition, complete SA payload in SA_INIT or SA and TS payload in AUTH/CREATE_CHILD_SA exchanges can be omitted which will reduce the message size and avoids the payload processing at both initiator and responder side. Based on these new notifications, both initiator and responder have to use the negotiated cryptographic suite and TS from existing old IKE SA and IPsec SA.

The present disclosure further discloses re-authentication using info/child/new exchange (OPTIMAL_REAUTH). As discussed earlier, IKEv2 has a small protocol weakness of being vulnerable to attacks since the initial negotiations (INIT exchange) are unencrypted and RFC allows to accept as many as responses we receive for a single request. This means that during reauth as well, it is prone to vulnerable attack, since reauth starts from INIT exchange.

To overcome said drawback, the present disclosure discloses performing reauth in an encrypted manner. In particular, it employs the info/child/new exchange (OPTIMAL_REAUTH) for doing reauth and encrypts the messages in the exchange using the old IKE SA, thereby preventing vulnerable attacks. Further, to reduce the number of exchanges during reauth all the phase1 and phase2 SA contents can be negotiated in the single exchange.

Figure 8:
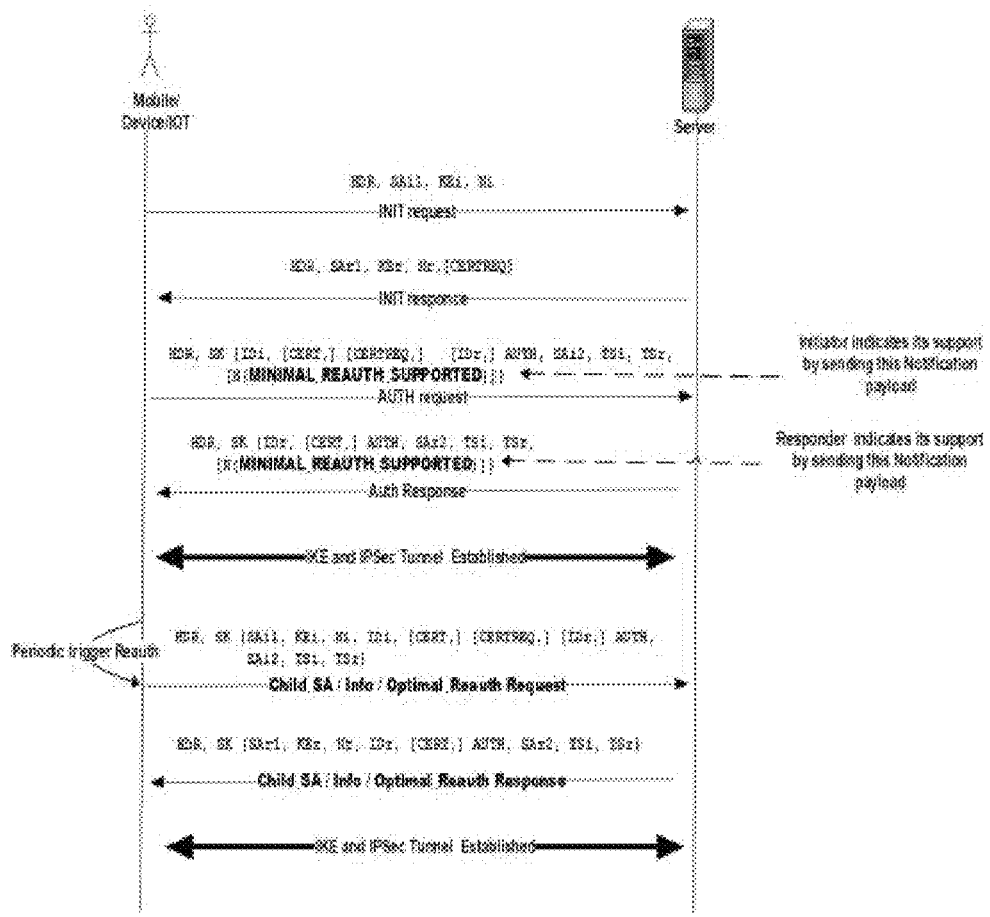
FIG. 8 illustrates a method of reauthentication by combining the conventional INIT and AUTH exchanges and encrypting them before sending said combination in the existing IKE tunnel, in accordance with another embodiment the present disclosure.
Figure 9:
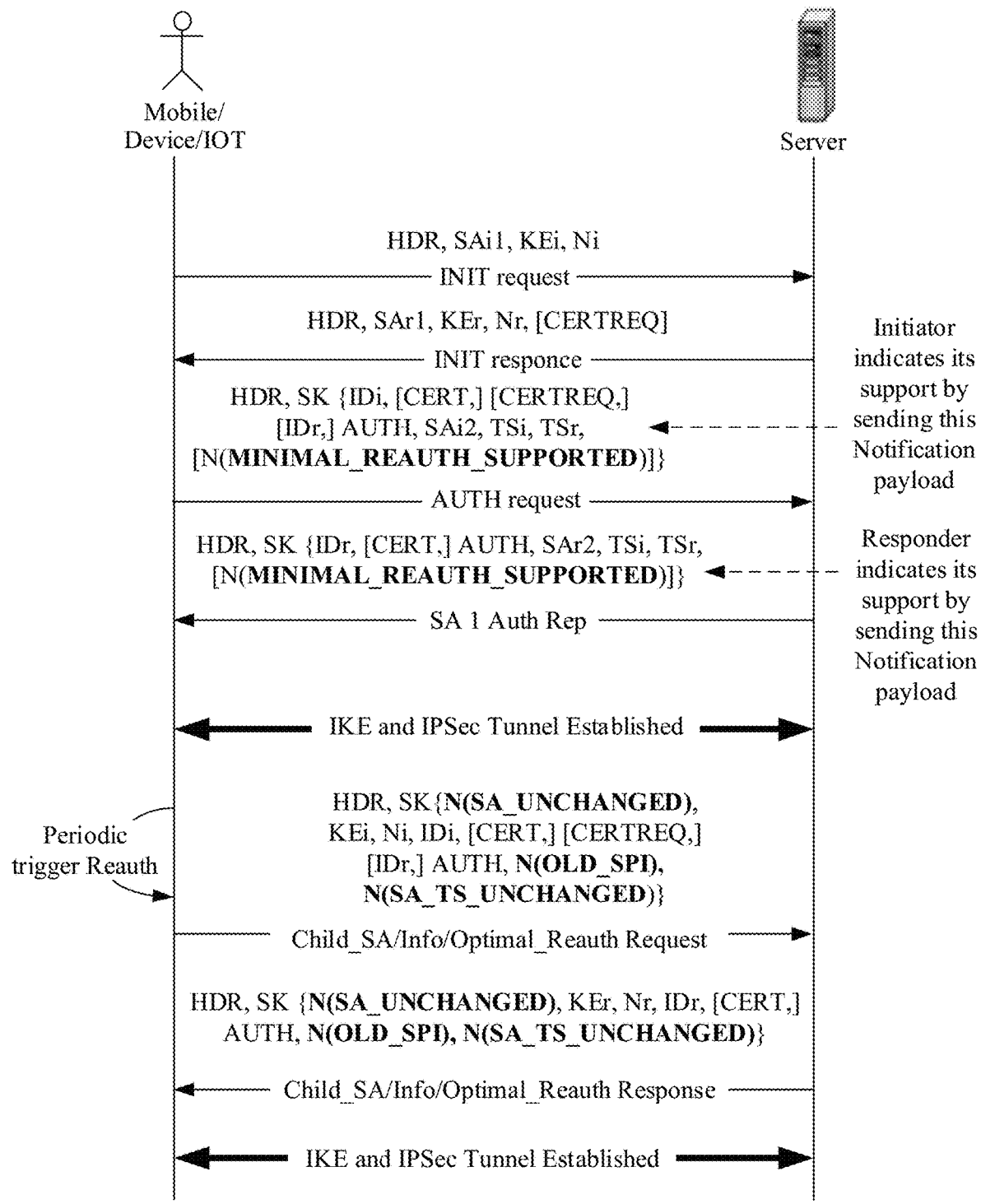
FIG. 9 illustrates a method of reauthentication by encrypted method wherein utilising the info or child or a new exchange type and encrypting the message by old IKE SA keys embodying all the necessary payloads in the same message and the SA_UNCHANGED, SA_TS_UN-CHANGED notify an old SPI value when SA, TS payloads have no change in the configuration on both sides as per RFC, in accordance with the present disclosure.

FIG. 8 illustrates new claim for doing reauthentication by encrypted method where in utilising the info or child or a new exchange type and encrypt the message by old IKE SA keys embodying all the necessary payloads in the same message as per RFC, in accordance with another embodiment the present disclosure. The reauth can be done in INFO/CREATE_CHILD_SA exchange or new exchange type (OPTIMAL_REAUTH) using old IKE SA. The message in the exchange will be protected by the OLD IKE SA. Further to reduce the number of exchanges during reauth, all the phase1 and phase2 SA contents can be negotiated through a single exchange INFO/Create_Child_SA/New Exch (OPTIMAL_REAUTH) instead of having both INIT and AUTH. Significantly, the SAi1 will contain initiator IKE SPI value for the new IKE SA while the SAr1 will contain responder IKE SPI value for the new IKE SA. Further, as illustrated in FIG. 9, if cryptographic suite and TS are not changed then, SA_UNCHNAGED and SA_TS_UNCHANGED notifications can be used to reduce the size of the message.

The present disclosure also discloses a new packet format: notification payload MINIMAL_REAUTH_SUPPORTED. The initiator indicates its support for minimum reauth by including a notification payload of type MINIMAL_REAUTH_SUPPORTED in AUTH request message. If the responder also supports this extension and is willing to use it, it includes this notification in the response message. The value for the new notification added may change when a draft is filed at the Internet Engineering Task Force (IETF). The name of the new notification will be decided by IPsec maintenance and extensions (IPsecme) group in the review of draft and value for notify is given by Internet Assigned Numbers Authority (IANA) separate entity.

In an embodiment, the SA_UNCHANGED notification must be included in INIT/AUTH/CREATE_CHILD_SA exchange when there is no SA payload. The New IKE/IPsec SA is created with the SPI values in the SA_UNCHANGED notification payload. In SA bundling case two SA_UNCHANGED notifications must be included in AUTH/CREATE_CHILD_SA exchange, one for AH and other for ESP. The SA_TS_UNCHANGED notification must be included in AUTH/CREATE_CHILD_SA exchange when there are no SA and TS payloads. The New IPsec SA is created with the SPI values in the SA_TS_UNCHANGED notify payload. In SA bundling cases two SA_TS_UNCHANGED notification must be included in a AUTH/CREATE_CHILD_SA exchange, one for AH and other for ESP.

```
The SA_UNCHANGED notification for AH is as follows:
    Type Payload: Notify (41)
    Next payload: Notify (41)
    0... .... = Critical Bit: Not Critical
    Payload length: 12
    Protocol ID: AH (2)
    SPI Size: 4
    Notify Message Typr: SA_CHANGED
    SPI: 1742f7f0
    Notification DATA : <MISSING>
The SA_TS_UNCHANGED notification for AH is as follows:
    Type Payload: Notify (41)
    Next payload: Notify (41)
    0... .... = Critical Bit: Not Critical
    Payload length: 12
    Protocol ID: AH (2)
    SPI Size: 4
    Notify Message Typr: SA_TS_UNCHANGED
    SPI: 1742f7f0
    Notification DATA : <MISSING>
The OLD_SPI notification for AH is as follows:
    Type Payload: Notify (41)
    Next payload: Notify (41)
    0... .... = Critical Bit: Not Critical
    Payload length: 12
    Protocol ID: AH (2)
    SPI Size: 4
    Notify Message Typr: OLD_SPI
    SPI: 1742f7f0
    Notification DATA : <MISSING>
```

In the present disclosure, to reduce the number of exchanges during reauth, all the phase 1 and phase 2 SA contents can be negotiated through a single exchange INFO/Create_Child_SA/New Exch (OPTIMAL_REAUTH) instead of having both INIT and AUTH messages. This exchange is protected over old IKE SA. Further, if cryptographic suite and TS are not changed then, SA_UNCHNAGED and SA_TS_UNCHANGED notifications are sent to reduce the size of the message. Therefore, it is possible to avoid four message negotiations to one message negotiation, thereby reducing the round-trip time to create one IKE and one IPsec SA. Further, denial-of-service (DOS) attack can be avoided on INIT as encrypted messages are exchanged. Furthermore, SA, Tsi/TsSr payloads are made optional so that processing time and bandwidth are saved.

Figure 10:
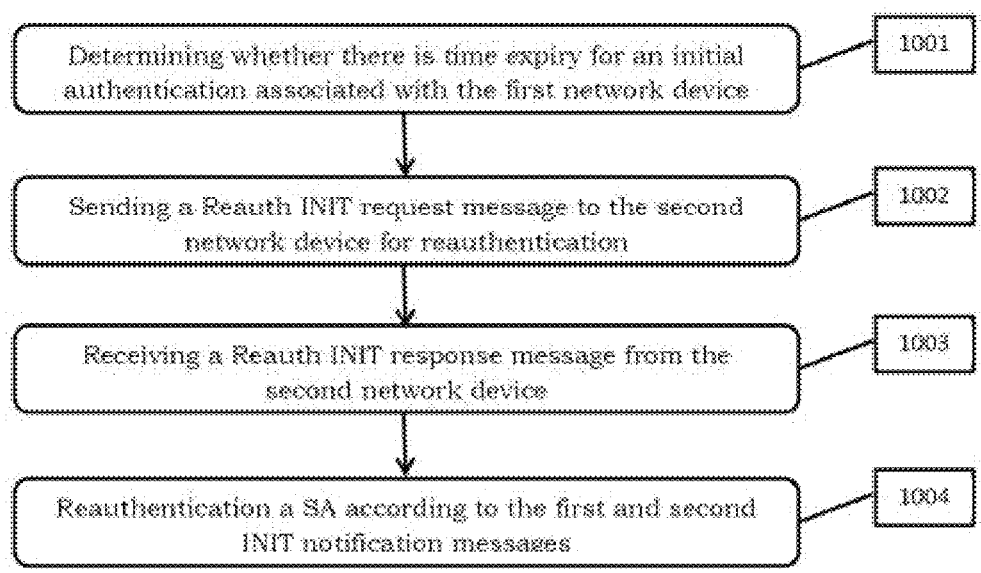
FIG. 10 illustrates a flowchart of the method of reauthentication in a network system, in accordance with the present disclosure.

FIG. 10 illustrates a flowchart of the method for reauthentication (reauth) said method comprising the steps of:

Step 1001: Determining whether there is time expiry for an initial authentication associated with the first network device (1201).

Step 1002: Sending a reauth INIT request message to a second network device (1202) for reauthentication, when there is no change in a cryptographic suite associated with the first network device (1201), wherein the reauth INIT request message comprises a first INIT notification message carrying a first NEW SPI value.

Step 1003: Receiving a reauth INIT response message from the second network device (1202), wherein the reauth INIT response message carries a second INIT notification message carrying a second NEW SPI value.

Step 1004: Reauthentication an SA according to the first NEW SPI value and the second NEW SPI value, when there is no change in the cryptographic suite associated with the first network device (1201) and in the cryptographic suite associated with the second network device (1202), wherein the cryptographic suite associated with the first network device (1201) is the same as the cryptographic suite associated with the second network device (1202).

Significantly, the initial two eight-octet fields in the header, called the "IKE SPIs", are used as a connection identifier at the beginning of IKE packets. In an embodiment, each endpoint chooses one of the two SPIs and must choose them so as to be unique identifiers of an IKE SA. Incoming IKE packets are mapped to an IKE SA only using the packet's SPI. The NEW SPI value of the present disclosure is a new random value generated which is used to identify new connection after reauth. Notably, the cryptographic suite associated with the first network device (1201) is stored locally at said first network device (1201) while the cryptographic suite associated with the second network device (1202) is stored locally at said second network device (1202).

Figure 11:
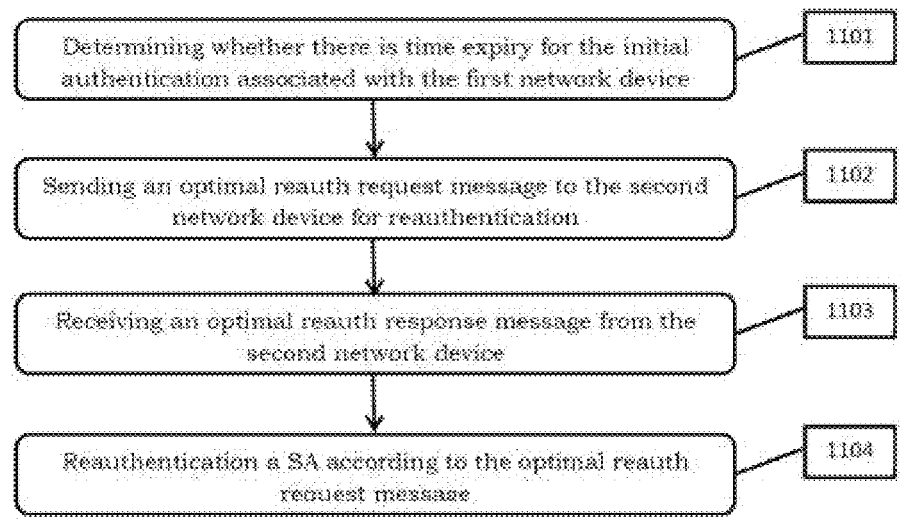
FIG. 11 illustrates a flowchart of another method of reauthentication in a network system, in accordance with the present disclosure.

FIG. 11 illustrates a flowchart of another method for reauthentication (reauth) said method comprising the steps of:

Step 1101: Determining (S1101) whether there is time expiry for the initial authentication associated with the first network device (1201).

Step 1102: Sending an optimal reauth request message to a second network device (1202) for reauthentication, when there is no change in a cryptographic suite associated with the first network device (1201), wherein the optimal reauth request message encrypted by OLD IKE SA keys comprises of SA, KE, Ni, CERT, CERTREQ, IDr, Idi, AUTH, TSi, TSr, Sai.

Step 1103: Receiving an optimal reauth response message from the second network device (1202), wherein the optimal reauth response message encrypted by keys of OLD IKE SA comprises SA, KE, Ni, CERT, CERTREQ, IDr, Idi, AUTH, TSi, TSr, Sar.

Step 1104: Reauthentication (S1104), by the first network device (1201), a SA according to the optimal reauth request message comprising a NEW SPI value and the optimal reauth response message comprising a NEW SPI value, when there is no change in the cryptographic suite associated with the first network device (1201) and in the cryptographic suite associated with the second network device (1202), wherein the cryptographic suite associated with the first network device (1201) is the same as the cryptographic suite associated with the second network device (1202).

Figure 12:
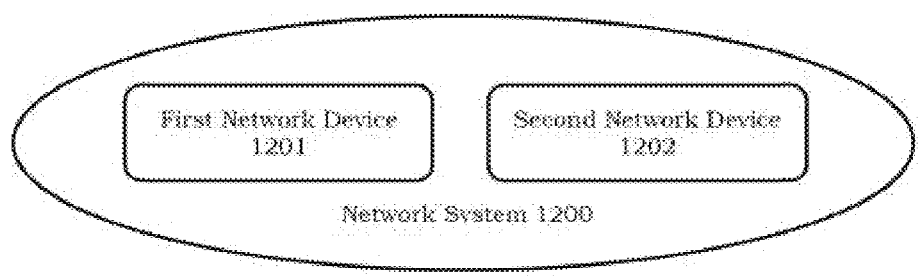
FIG. 12 illustrates a block diagram of the network system that performs the methods for reauthentication, in accordance with the present disclosure.

FIG. 12 illustrates a block diagram of the network system (1200) that performs the methods for reauthentication illustrated in FIG. 10 and FIG. 11. This system for reauthentication (reauth) in a network system comprises a first network device (1201) and a second network device (1202).

Some of the non-limiting advantages and future implementations of the present disclosure are indicated hereinbelow.

For IoT devices power consumption and processing time is very important. By making these payloads optional, we can avoid sending SA and TS payloads which reduces power, processing time and bandwidth.

It helps all the devices to save power, processing time and bandwidth.

In fourth generation (4G) network security gateways/Evolved Packet Data Gateway (ePDG) and in fifth generation (5G) networks Cloud-Radio Access Network (cRAN)/Cloud will support more than one 100000 IKE/IPsec tunnels. Accordingly, on an average, for every second a rekey is encountered. This consumes huge amount of bandwidth, packet fragmentation and more processing and these problems are solved by the present disclosure.

In vehicle-to-everything (V2X) scenario, where there are number of pseudo certificates issued to a vehicle to negotiate with gateway, in such cases whenever their certificates expire then the reauth will be triggered. All these certificates will have a lower life time ranging from few hours to one day.

DOS Attack on IKEv2 can be reduced at least during the reauth.

A person skilled in the art may understand that any known or new algorithms be used for the implementation of the present disclosure. However, it is to be noted that, the present disclosure provides methods and systems for IKEv2 re-authentication optimization to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus, method or system may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure essentially, or the part contributing to the other approaches, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for methods and systems for IKEv2 re-authentication optimization has been described in language specific to structural features and/or methods, it is to be understood that the appended claims are not necessarily limited to the specific features or methods described. Rather, the specific features and methods are disclosed as examples of implementations of IKEv2 re-authentication optimization for SA and TS payloads support.

What is claimed is:

1. A method, comprising:
    sending, by a first network device and to a second network device, an initial reauthentication request message when a time for an initial authentication associated with the first network device expires and when a first cryptographic suite associated with the first network device is not changed, wherein the initial reauthentication request message comprises a first notification message carrying a first security parameters index (SPI) value;
    receiving, by the first network device, from the second network device, and in response to sending the initial reauthentication request message, an initial reauthentication response message, wherein the initial reauthentication response message carries a second notification message, and wherein the second notification message carries a second SPI value; and
    reauthenticating, by the first network device and according to the first SPI value and the second SPI value, a security association associated with the first network device when the first cryptographic suite and a second cryptographic suite associated with the second network device are not changed, wherein the first cryptographic suite is the same as the second cryptographic suite.

2. The method of claim 1, further comprising establishing an Internet Key Exchange (IKE) tunnel and an Internet Protocol Security (IPSec) tunnel between the first network device and the second network device.

3. The method of claim 1, wherein either the first notification message or the second notification message indicates that the security association is not changed.

4. The method of claim 1, wherein the security association comprises either a first Internet Key Exchange (IKE) security association or a first Internet Protocol Security (IPSec) security association.

5. The method of claim 4, further comprising:
    deleting the first IKE security association and creating a second IKE security association when the security association is the first IKE security association, wherein a first SPI is an initiator SPI deployed as an initiator cookie for the second IKE security association, and wherein a second SPI is deployed as a responder cookie for the second IKE security association; and
    deleting the first IPSec security association and creating a second IPSec security association when the security association is the first IPSec security association, wherein the first IPSec security association is a child security association of the first IKE security association, wherein the first SPI is deployed as a first inbound SPI in the first network device for the second IPSec security association and is deployed as a second outbound SPI in the second network device for the second IPSec security association, and wherein the second SPI is deployed as a second inbound SPI in the second network device for the second IPSec security association and is deployed as a first outbound SPI in the first network device for the second IPSec security association.

6. The method of claim 1, further comprising:
sending, to the second network device, a reauthentication request message comprising a first authentication notification payload when a security association payload and a traffic selector payload are not changed; and
receiving, from the second network device, a reauthentication response message comprising a second authentication notification payload when the second cryptographic suite is not changed.

7. The method of claim 6, wherein either the first authentication notification payload or the second authentication notification payload indicates that the security association payload and the traffic selector payload are not changed.

8. The method of claim 6, wherein the reauthentication request message further comprises a first SPI notification message comprising a first SPI to identify a first Internet Key Exchange (IKE) security association or a first Internet Protocol Security (IPSec) security association at the first network device.

9. The method of claim 8, wherein the reauthentication request message instructs the second network device to identify a first IKE security association using the first SPI notification message to identify the security association on the second network device.

10. The method of claim 6, further comprising:
creating, using a create child security association exchange message, a first Internet Protocol Security (IPSec) security association that is a first child security association of an Internet Key Exchange (IKE) security association; and
deleting, using the create child security association exchange message, a second IPSec security association,
wherein a first SPI is deployed as a first inbound SPI in the first network device for the first IPSec security association and is deployed as a first outbound SPI in the first network device for the first IPSec security association,
wherein a second SPI is deployed to identify the second IPSec security association that is a second inbound SPI of a second security association and is a second outbound SPI of the second security association in the second network device, and
wherein a third SPI is deployed as a third inbound SPI in the second network device for the first IPSec security association and is deployed as a third outbound SPI in the first network device for the first IPSec security association.

11. A method, comprising:
sending, by a first network device and to a second network device, a reauthentication request message when a time for an initial authentication associated with the first network device expires and when a first cryptographic suite associated with the first network device is not changed, wherein the reauthentication request message comprises a first security parameters index (SPI) value, and wherein the reauthentication request message is encrypted by first Internet Key Exchange (IKE) security association keys comprising a security association, a keying payload, a nonce, a certificate, a certificate request, an optional identity response, an initiator payload, an authentication payload, traffic selectors of initiators and responders, or an Internet Protocol Security (IPSec) security association payload;

receiving, by the first network device, from the second network device, and in response to sending the reauthentication request message, a reauthentication response message encrypted by the first IKE security association keys, wherein the reauthentication response message comprises a second SPI value; and
reauthenticating, by the first network device and according to the reauthentication request message comprising the first SPI value and the reauthentication response message comprising the second SPI value, the security association associated with the first network device when there is no change in the first cryptographic suite associated with the first network device and in a second cryptographic suite associated with the second network device, wherein the first cryptographic suite is the same as the second cryptographic suite.

12. The method of claim 11, further comprising establishing an IKE tunnel and an IPSec tunnel between the first network device and the second network device.

13. The method of claim 11, further comprising:
deleting a first IKE security association and creating a second IKE security association when the security association is the first IKE security association, wherein a first SPI is an initiator SPI deployed as an initiator cookie for the second IKE security association, and wherein a second SPI is deployed as a responder cookie for the second IKE security association; and
deleting a first IPSec security association and creating a second IPSec security association when the security association is the first IPSec security association, wherein the first IPSec security association is a child security association of the first IKE security association, wherein the first SPI is deployed as a first inbound SPI in the first network device for the second IPSec security association and is deployed as a second outbound SPI in the second network device for the second IPSec security association, and wherein the second SPI is deployed as a second inbound SPI in the second network device for the second IPSec security association and is deployed as a first outbound SPI in the first network device for the second IPSec security association.

14. The method of claim 11, wherein the security association comprises an IKE security association or an IPSec security association.

15. A first network device comprising:
a memory configured to store instructions; and
at least one processor coupled to the memory and configured to execute the instructions to cause the first network device to:
send, to a second network device coupled to the first network device, an initial reauthentication request message when a time for an initial authentication associated with the first network device expires and when a first cryptographic suite associated with the first network device is not changed, wherein the initial reauthentication request message comprises a first notification message carrying a first security parameters index (SPI) value;
receive, from the second network device and in response to sending the initial reauthentication request message, an initial reauthentication response message, wherein the initial reauthentication response message carries a second notification message, and wherein the second notification message carries a second SPI value; and reauthenticate, according to the first SPI value and the second SPI value, a first security association associated with the first network device when the first cryptographic suite and a second cryptographic suite associated with the second network device are not changed, wherein the first cryptographic suite is the same as the second cryptographic suite.

16. The first network device of claim 15, wherein either the first notification message or the second notification message indicates that the first security association is not changed.

17. The first network device of claim 15, wherein the first security association comprises a first Internet Key Exchange (IKE) security association or a first Internet Protocol Security (IPSec) security association.

18. The first network device of claim 17, wherein the at least one processor is further configured to execute the instructions to cause the first network device to:
   delete the first IKE security association and create a second IKE security association when the first security association is the first IKE security association, wherein a first SPI is an initiator SPI deployed as an initiator cookie for the second IKE security association, and wherein a second SPI is deployed as a responder cookie for the second IKE security association; and
   delete the first IPSec security association and create a second IPSec security association when the first security association is the first IPSec security association, wherein the first IPSec security association is a child SA of the first IKE security association, wherein the first SPI is deployed as a first inbound SPI in the first network device for the second IPSec security association and is deployed as a second outbound SPI in the second network device for the second IPSec security association, and wherein the second SPI is deployed as a second inbound SPI in the second network device for the second IPSec security association and is deployed as a first outbound SPI in the first network device for the second IPSec security association.

19. The first network device of claim 15, wherein the at least one processor is further configured to execute the instructions to cause the first network device to:
   send, to the second network device, a reauthentication request message comprising a first authentication notification payload when a security association payload and a traffic selector payload are not changed; and
   receive, from the second network device, a reauthentication response message comprising a second authentication notification payload when the second cryptographic suite is not changed.

20. The first network device of claim 19, wherein either the first authentication notification payload or the second authentication notification payload indicates that the first security association and the traffic selector payload are not changed.

21. The first network device of claim 19, wherein the reauthentication request message further comprises a third notification message comprising an SPI to identify an Internet Key Exchange (IKE) security association or an Internet Protocol Security (IPSec) security association at the first network device.

22. The first network device of claim 19, wherein the at least one processor is further configured to execute the instructions to cause the first network device to:
   create, using a create child security association exchange message, a first Internet Protocol Security (IPSec) security association that is a child security association of an Internet Key Exchange (IKE) security association; and
   delete, using the create child security association exchange message, a second IPSec security association,
   wherein a first SPI is deployed as a first inbound SPI in the first network device for the first IPSec security association and is deployed as a first outbound SPI in the first network device for the first IPSec security association,
   wherein a second SPI is deployed to identify the second IPSec security association that is a second inbound SPI of a second security association and is a second outbound SPI of the second security association in the second network device, and
   wherein a third SPI is deployed as a third inbound SPI in the second network device for the first IPSec security association and is deployed as a third outbound SPI in the first network device for the first IPSec security association.

23. A first network device comprising:
a memory configured to store instructions; and
at least one processor coupled to the memory and configured to execute the instructions to cause the first network device to:
   send, to a second network device coupled to the first network device, a reauthentication request message when a time for an initial authentication associated with the first network device expires and when a first cryptographic suite associated with the first network device is not changed, wherein the reauthentication request message comprises a first security parameters index (SPI) value, and wherein the reauthentication request message is encrypted by Internet Key Exchange (IKE) security association keys of a security association, a keying payload, a nonce, a certificate, a certificate request, an optional identity response, an initiator identity payload, an authentication payload, traffic selectors of initiators and responders, or an Internet Protocol Security (IPSec) payload;
   receive, from the second network device and in response to sending the reauthentication request message, a reauthentication response message encrypted by the IKE security association keys, wherein the reauthentication response message comprises a second SPI value; and
   reauthenticate, according to the reauthentication request message comprising the first SPI value and the reauthentication response message comprising the second SPI value, the security association associated with the first network device when the first cryptographic suite and a second cryptographic suite associated with the second network device are not changed, wherein the first cryptographic suite is the same as the second cryptographic suite.

24. The first network device of claim 23, wherein the at least one processor is further configured to execute the instructions to cause the first network device to:
   delete a first IKE security association and create a second IKE security association when the security association is the first IKE security association, wherein a first SPI is an initiator SPI deployed as an initiator cookie for the second IKE security association, and wherein a second SPI is deployed as a responder cookie for the second IKE security association; and delete a first IPSec security association and create a second IPSec security association when the security association is the first IPSec security association, wherein the first IPSec security association is a child SA of the first IKE security association, wherein the first SPI is deployed as a first inbound SPI in the first network device for the second IPSec security association and is deployed as a second outbound SPI in the second network device for the second IPSec security association, and wherein the second SPI is deployed as a second inbound SPI in the second network device for the second IPSec security association and is deployed as a first outbound SPI in the first network device for the second IPSec security association.

25. The first network device of claim 23, wherein the security association comprises an IKE security association or an IPSec security association.

* * * * *